United States Patent Office 3,082,772
Patented Mar. 26, 1963

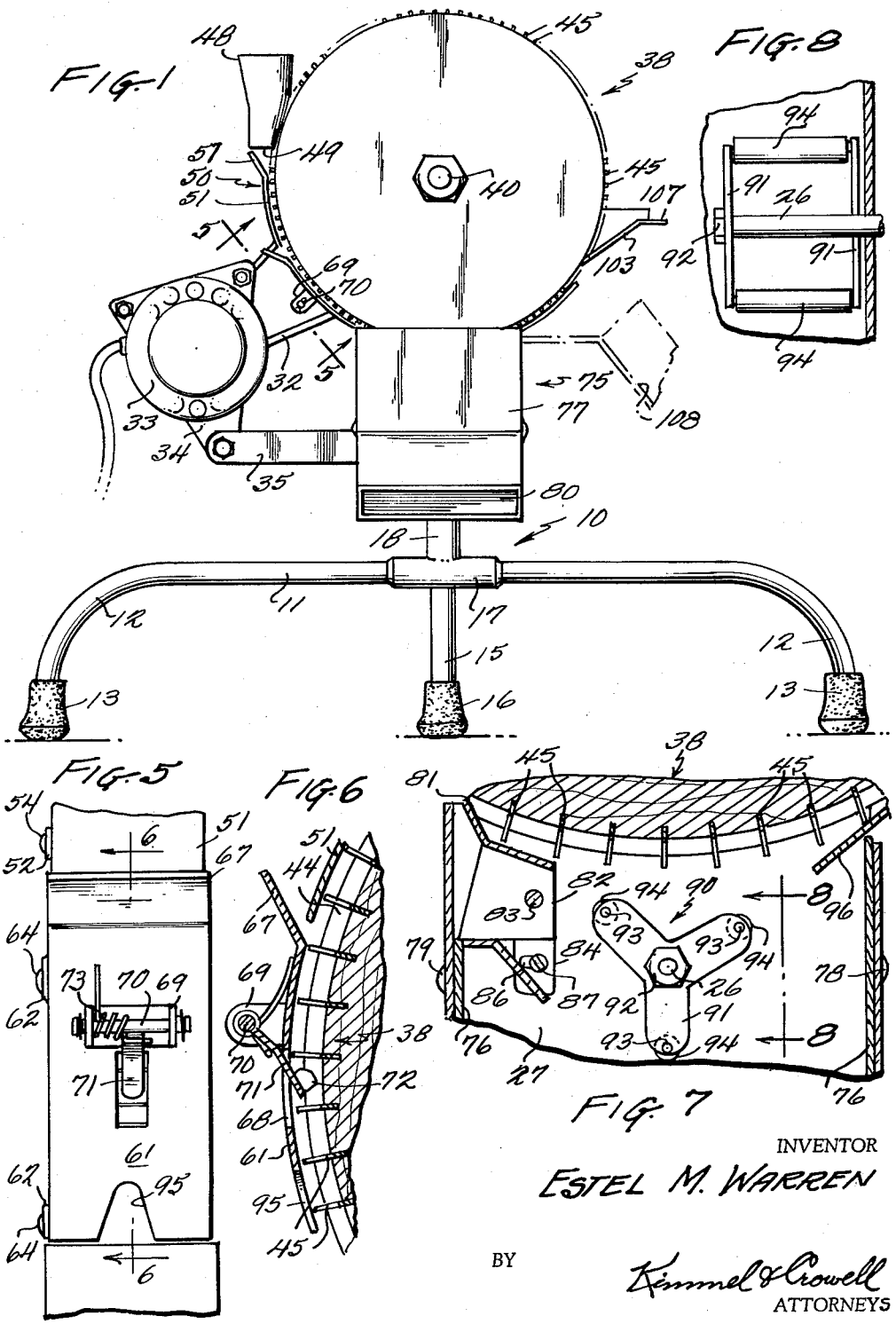

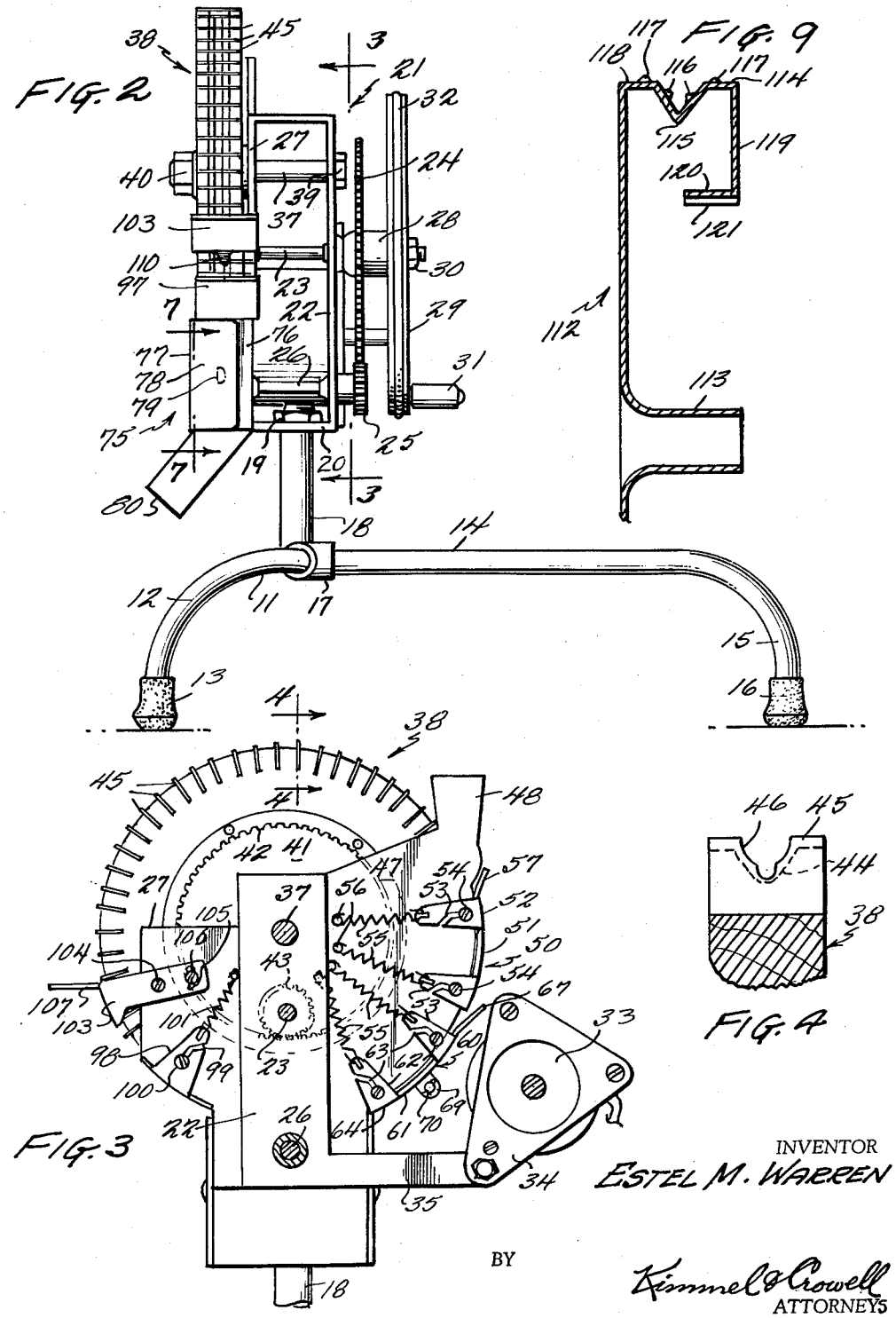

3,082,772
PEA SHELLER
Estel M. Warren, 311 Elizabeth St., Clinton, N.C.
Filed Aug. 25, 1961, Ser. No. 133,812
8 Claims. (Cl. 130—30)

This invention relates to a pea sheller, and has as its primary object the provision of an improved pea sheller particularly adapted for home use, which will readily and expeditiously extricate peas from their hulls with a minimum of time, effort and difficulty.

Another important object of the invention is the provision of a device of this character which will remove the peas from their hulls without mashing or cutting the peas.

Still another object of the invention is the provision of a device of this character which will readily automatically adjust itself to a relatively wide range of variation in the size of hulls and peas inserted therein and operate effectively regardless of the size.

A further object of the invention is the provision of a device of this character which may be readily assembled and disassembled, whereby the interior thereof may be readily cleaned as needed.

Still another object of the invention is the provision of such a device which is motor driven, and which will operate at a high rate of speed completely and effectively shelling peas with a minimum of effort and difficulty.

Another object of the invention is the provision of a device of this character having an improved hull slitting knife which is yieldably mounted adjacent the periphery of a rotatable disc, and which includes a transverse flange which limits the depth of the cut, so as to avoid cutting the peas, regardless of the size of the hull or the peas contained therein.

A still further object of the invention resides in the provision in a device of this character, of a relatively high speed rotating member which is rotatably mounted adjacent the disc which knocks the peas from the hull into a chute after the hull has been split.

A further and more specific object of the invention is the provision of an improved device for removing the hulls after the peas have been extricated therefrom and separating them from the rotatable disc or wheel.

Still other objects reside in the combination of elements, arrangement of parts, and features of construction.

Other objects will in part be obvious and in part be pointed out as the description of the invention proceeds and shown in the accompanying drawings wherein:

FIGURE 1 is a side elevational view of one form of pea sheller constructed in accordance with the instant invention.

FIGURE 2 is an end elevational view of the structure of FIG. 1.

FIGURE 3 is an enlarged sectional view taken substantially along the line 3—3 of FIG. 2 as viewed in the direction indicated by the arrows.

FIGURE 4 is a fragmentary enlarged sectional view taken substantially along the line 4—4 of FIG. 3 as viewed in the direction indicated by the arrows.

FIGURE 5 is a fragmentary enlarged sectional view taken substantially along the line 5—5 of FIG. 1 as viewed in the direction indicated by the arrows.

FIGURE 6 is a fragmentary sectional view taken substantially along the line 6—6 of FIG. 5 as viewed in the direction indicated by the arrows.

FIGURE 7 is an enlarged fragmentary sectional view taken substantially along the line 7—7 of FIG. 2 as viewed in the direction indicated by the arrows; and FIGURE 8 is a sectional view taken substantially along the line 8—8 of FIG. 7 as viewed in the direction indicated by the arrows.

FIGURE 9 is a vertical sectional view of a modified form of shelling disc formed from a single metal stamping.

Similar reference characters refer to similar parts throughout the several views of the drawing.

Having reference now to the drawings in detail, the device of the instant invention comprises a supporting frame generally indicated at 10 which includes a pair of oppositely extending leg members 11 having downwardly extending ends 12 provided with rubber tips or cups 13, and a rearwardly extending leg 14 which is also provided with a downwardly curving extremity 15 and a rubber cup 16 substantially identical to cups 13. The legs 11 and 14 intersect at a standard T 17 which is provided with an upright central member 18, which is suitably secured as by clamping nut 19 or the like in the bight 20 of a supporting frame generally indicated at 21. Frame 21 includes an upright rear wall 22 which is apertured to receive a drive shaft 23, which has mounted thereon a large reduction gear 24. The gear 24 meshes with a smaller gear 25 which is mounted on a shaft 26, the latter being journalled in the rear wall 22 and also in a front wall 27 of the frame member, which latter also serves to journal the other end of the shaft 23. A suitable spacer 28 is provided adjacent the gear 24 and has mounted therebeyond a drive pulley 29, the assembly being held in position by means of a lock nut 30. Drive pulley 29 is provided with a manual operating handle 31, which may be used to rotate the same, and other portions of the apparatus in a manner to be described more fully hereinafter, but is also provided with a drive belt 32 which extends to the drive pulley (not shown) of a conventional electric motor 33 which is carried by a pair of triangular brackets 34 mounted on legs 35 which extend outwardly from the plates 22 and 27 adjacent their lower extremities.

A shaft 37 journalled between frame walls 22 and 27 supports a shelling disc generally indicated at 38, the shaft being secured in position at its opposite ends by means of lock nuts 39 while a nut 40 holds the disc 38 in position for rotation. Disc 38 in the form of the invention disclosed in FIGS. 1 to 8 is preferably comprised of wood, and has a central recess 41 which carries an internal ring gear 42. Ring gear 42 is driven by a pinion gear 43 which is mounted on the shaft 23, and driven by the pulley 29.

An annular V-shaped groove 44 extends about the periphery of disc 38 and is provided at spaced intervals with transversely extending plates or blades 45, which are centrally cut away as at 46 (see FIG. 4) and which provide a means for holding the pea hull in position in the groove 44.

Front frame member 27 includes a side portion 47 which has secured to the upper extremity thereof a tubular chute or hopper 48 into which individual pea hulls are adapted to be inserted. It is to be understood that while there is herein shown a relatively smaller hopper for the manual reception of individual pea hulls, that a relatively large hopper may also be provided and contain any desired guide means so that a large number of peas may be positioned therein and suitably aligned to adapt the device to commercial if desired.

A first arcuate guide plate is positioned directly beneath the outlet of the hopper 48 and is generally indicated at 50. The plate comprises a flange 51 which overlies the periphery of the disc 38, and has secured thereto a pair of ears 52, each of which is provided with a bayonet slot construction 53, which is adapted to fit over a headed stud 54 on the plate 47 to facilitate removal of the device. Tension springs 55 are connected at one of their ends to the end of each ear 52 and at their other ends to a stud 56, providing a yielding engagement of the plate 50 with the rim of the disc to accommodate pea hulls of various size. A guide flange 57 extends outwardly from the flange 51 immediately adjacent the opening 49 at the lower end of the hopper 48.

Immediately adjacent and below the guide plate 50 is a second guide plate 60 which includes a similar arcuate flange 61, and ears 62 having slots 63 therein which fit over studs 64 in the same manner as that previously described, and which have secured to their ends tension springs 65, the opposite ends of which engage studs 66 for the purpose of yieldingly holding the plate 61 in position. A flange 67 similar to the flange 57 is also provided for guiding the hulls. The plate 60 is, however, provided with a longitudinal slot 68 adjacent the upper end of which are a pair of ears 69 between which extends a shaft 70 (see FIGS. 5 and 6). The shaft has integrally affixed thereto a flat plate 71 which carries a perpendicular knife blade 72, which normally extends into the groove or channel 44 in the wheel or disc 38. A spring 73 surrounds the shaft 70 and biases the knife in a direction towards the disc 38. By virtue of this arrangement the knife 72 is constantly biased into engagement with the pea hulls carried by the disc 38 in the groove 44, to slit the bottom or peripheral edge of the hull, the depth of the cut being limited to an extent where it will merely split the hull, and not cut the peas contained therein.

A chute is generally indicated at 75 adjacent the lowermost portion of the disc 38, and is comprised of the inner surface of front frame plate 27, and a pair of forwardly extending flanges 76, over which fits a cover 77 having side flanges 78 with suitable detents 79 formed thereon resiliently to hold the front cover in position. An offset angularly disposed closed chute 80 extends forwardly from the open bottom formed by the flanges 76 and 78, and the front wall 77 of the chute, the extension 80 being adapted to be positioned over any suitable receptacle for the reception of peas removed from the hull. Removal of the pod from the wheel is effected by a finger 81 (see FIG. 7) which extends into the channel or groove 44 beyond the knife blade 72, and interiorly of the chute 75, and serves to strip the pod and its attached peas. Finger 81 comprises a portion of a support 82 which is carried interiorly of the chute 75, and which is pivotally mounted on a screw 83. A tongue 84 is provided having a slot 86 therein which extends about a screw 87 to permit limited pivotal movement of the support 82 in order to vary the depth of penetration of the finger 81 into the groove as may be desired.

After the finger 81 has released the slit pod from wheel 38, the peas are vibrated or agitated from the hull or pod by means of a rotatable member generally indicated at 90 which includes a plurality of arms 91 rotatably mounted on shaft 26, the assembly being secured in position by means of a nut 92. The arms 91 thus form in effect a pair of spaced spiders rotatably mounted on the shaft 91, between the extremities of the arms of which extend shafts 93 which carry resilient buffers or cushions 94. The spiders are rotated by means of the shaft 26 in a manner previously described at a much higher speed than the speed of rotation of the disc 38, and rotate closely adjacent the extremities of the plates 45 to effectively knock the peas from the split hulls.

It is to be noted that a U-shaped opening 95 in the lower extremity of the plate 61 permits the flattening of the hulls or pods to raise the peas by means of the finger 81 in the manner previously described.

As the peas are removed from the hull they fall through extension 80 of chute 75 into any suitable receptacle and the elongated flattened hulls are forced back into engagement with plates 45 and carried by wheel 38 to pass over a flange 96 which comprises an integral portion of a guide plate 97 and extends through an opening in the side wall of the guide chute 75. The guide plate 97 includes an arcuate portion overlying the perimeter of the disc 38 and an ear 98 which is provided with a slot 99 extending over a stud 100 and which is held in position by means of a spring 101, the other end of which engages a stud 102 secured to the plate 27, the arcuate plate 97 thus being yieldable to accommodate various thicknesses of hulls. The hulls are removed from the disc by means of a scraper blade 103 which lies closely adjacent the extremities of the plates 46, and which is pivotally mounted as on a pin 104 on plate 27. An arcuate slot 105 engaged by a screw 106 permits adjustment of the relative position of the blade 103, a guide plate 107 being provided to facilitate direction of the pea hulls to a receptacle.

If desired, an additional guide plate 108 may be positioned beneath the scraper 103 for deflecting the removed hulls to any desired receptacle for removal thereof.

From the foregoing the use and operation of the device should now be readily understandable. Pea hulls are inserted in the hopper 48, after the motor 33 has been started to rotate the component parts, and are guided into the central groove 46 and held in position by the lugs 45. They then pass beneath the yieldable guide plates 51 and 61, the yieldable plates accommodating a wide variety of sizes of pea hulls, and the hulls are split along the bottom with a knife bade 72. The pods are then lifted from the wheel by the finger 81 and the peas are vibrated out of the hull by the rotating resilient members 94. The hulls are then guided outwardly of the chute 75 by means of the flange 96 of guide 97 and are removed by the scraper blade 103. It is to be noted that, as best shown in FIG. 2, blade 103 carries a finger 110 which extends into the groove 44 to effect complete removal thereof. The hulls are then guided by the plates 107 and 108 to a suitable waste receptacle, while the hulled peas pass out of the chute 80 into a receptacle provided for the reception thereof.

FIGURE 9 discloses a slightly modified form of wheel construction, which operates in basically the same manner. The wheel of FIG. 9 is generally indicated at 112 and comprises a single sheet metal stamping formed with a hub 113 which is adapted to engage about shaft 37 and is driven by the gear 23. A rim 114 is also provided with a groove 115 therein having a plurality of tongues 116 struck from the inner side thereof and a plurality of additional tongues 117 struck from the outer rim, the tongues 116, 117 serving the same purpose as the lugs 45. A clear space 118 is provided on each side of the tongues 117 to permit the close juxtaposition of a scraper blade to remove the hulls from the disc. The wheel 112 also includes a depending internal flange 119 having an internal rim 120 with serrations 121 thereon, the serrations 121 taking the place of the ring gear 42 and being engaged by the drive gear 43.

From the foregoing it will now be seen that there is herein provided an improved pea sheller which accomplishes all the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. A device for shelling peas comprising, in combination, a supporting frame, a rotatably mounted disc carried thereby, said disc having an annular groove for the reception of a pea hull in the rim thereof, a plurality of centrally grooved radially extending blades carried by said disc, a hopper for the insertion of a pea hull adjacent the rim of said disc, a plurality of spring biased guides positioned about the lower periphery of said disc, a hull splitting knife extending longitudinally relative to the direction of said groove carried by one of said guides, a guide chute for hulled peas adjacent the lowermost point of said disc, a finger for removing the split hulls and their attached peas from said disc, rotatable members in said guide chute closely adjacent the periphery of said disc for vibrating the hulls to remove the peas from the split hulls, said rotary members repositioning the empty hulls in said groove, means for rotating said disc, said disc then carrying the empty hulls out of said guide chute, a scraper for removing the empty hulls from said disc, and guide means carrying said empty hulls to a disposal point.

2. The structure of claim 1 wherein said means for rotating said disc comprises an electric motor carried by said frame.

3. The structure of claim 1 wherein said rotatable member in said guide chute comprises a hub, a plurality of pairs of arms carried thereby and cushioned members extending between the arms of each pair at the end of said arms for vibrating said hulls to agitate peas from the split hull.

4. The structure of claim 3 wherein reduction gearing is interposed between the means for rotating said disc and a common shaft drives said rotatable member and said reduction gearing.

5. The structure of claim 4 wherein said disc is stamped from a single sheet of metal and includes an inner rim having serrations therein comprising a part of said reduction gearing.

6. The structure of claim 1 wherein said guide chute is comprised of a single removable member carried by said frame, and spring clip means to secure said member to said frame.

7. The structure of claim 1 wherein said spring biased guides comprise arcuate members secured to said frame by studs and bayonet slots for ready removal thereof.

8. The structure of claim 1 wherein said hull splitting knife is yieldably mounted against said disc and comprises a blade extending perpendicularly to the plane of the disc and a transverse flange limiting the depth of the cut.

References Cited in the file of this patent
UNITED STATES PATENTS

| | | |
|---|---|---|
| 1,302,005 | Bullard | Apr. 29, 1919 |
| 2,558,899 | Green | July 31, 1951 |